United States Patent [19]

Stemmler

[11] Patent Number: 4,553,197
[45] Date of Patent: Nov. 12, 1985

[54] CONVERTER WITH FAST-ACTING OVERVOLTAGE PROTECTION

[75] Inventor: Herbert Stemmler, Kirchdorf, Switzerland

[73] Assignee: BBC Brown, Boveri & Company, Limited, Baden, Switzerland

[21] Appl. No.: 544,639

[22] Filed: Oct. 24, 1983

[30] Foreign Application Priority Data

Nov. 3, 1982 [CH] Switzerland .................. 6387/82
Oct. 6, 1983 [EP] European Pat. Off. ...... 83109993.2

[51] Int. Cl.$^4$ ............................................. H02M 5/45
[52] U.S. Cl. ................................... 363/37; 363/41; 363/58; 363/72
[58] Field of Search ............. 307/252 C, 82; 318/801, 318/802, 803, 811; 363/37, 41, 48, 54, 58, 129, 137, 138, 72

[56] References Cited

U.S. PATENT DOCUMENTS

| | | | |
|---|---|---|---|
| 4,039,914 | 8/1977 | Steigerwald et al. | 318/762 |
| 4,188,659 | 2/1980 | Cailloux | 363/37 |
| 4,247,888 | 1/1981 | Angquist | 363/37 |
| 4,270,078 | 5/1981 | Walker et al. | 363/37 |
| 4,314,189 | 2/1982 | Okado et al. | 363/37 |
| 4,328,454 | 5/1982 | Okuyama et al. | 363/37 |
| 4,361,866 | 11/1982 | Shima et al. | 363/129 |
| 4,369,492 | 1/1983 | Moll et al. | 363/58 |
| 4,375,612 | 3/1983 | Wirth | 363/48 |
| 4,399,395 | 8/1983 | Espelage | 363/37 |
| 4,405,977 | 9/1983 | Bhagwat et al. | 363/138 |
| 4,447,695 | 5/1984 | Inoue | 363/37 |

OTHER PUBLICATIONS

Taschenbuch Elektrotechnik, vol. 5; VEB Verlag Technik, Berlin, 1980; pp. 463–469.
"Converter Fed Synchronous Motor for Run-Up and Speed Control of Large Turbocompressors"; Brown Boveri, 1982; pp. 157–162.

Primary Examiner—William H. Beha, Jr.
Assistant Examiner—Jeffrey Sterrett

[57] ABSTRACT

A power converter typically used for operating electrical machines and provided with protective measures to protect against overvoltages which can otherwise occur in the process of switching off the inductive loads represented by the electrical machines. To that end, the converter includes plural bridge circuits having a.c. voltage terminals and d.c. voltage terminals, wherein the a.c. voltage terminals are phasewise parallel-connected and coupled to each other via at least one capacitor and wherein the d.c. voltage terminals are coupled to each other via at least one intermediate circuit reactor. The bridge circuits include bridge arms having GTO thyristors that can be switched off, and the plural bridges are driven out of phase with respect to one another. In this way, the converter supplies an alternating current which is relatively near-sinusoidal and exhibits a low harmonics content to the electrical machine. Following turning off of the thyristors in the bridge circuits of the converter, energy stored in the machine is temporarily stored in the capacitors coupling the A.C. terminals of the bridge circuits, so that no impermissible overvoltages occur.

6 Claims, 7 Drawing Figures

CONVERTER WITH FAST-ACTING OVERVOLTAGE PROTECTION

BACKGROUND OF THE INVENTION

1. Field of the Invention

This invention relates to a static power converter, and uses for the static power converter.

Static power converters are devices for converting electrical power, and include one or more sets of diodes, or sets of thyristors, and, as appropriate, a power-converter transformer, reactors, switching units, and further auxiliary devices. They are designed, inter alia, as rectifiers, inverters, and converters, and are used for operating electrical machines. During operation, static power converters are subject to current harmonics, which lead to undesirable feedback perturbations affecting the current-supply system. If no protective measures are adopted, dangerous overvoltages can occur in the process of switching off inductive loads, and both these loads and the semiconductor components of the power converters are particularly endangered by such overvoltages.

The state of the static power converter art is described in the Taschenbuch Elektrotechnik [Electrical Technology Pocket-Book], Volume 5, VEB Verlag Technik, Berlin, 1980, page 463 to 469. This literature reference describes a motor which is supplied from a static power converter. In order, over the run-up range, to guarantee the commutation of the inverter which is connected on the motor side, the current in the direct-current intermediate circuit is automatically adjusted to zero, under the control of a timing-pulse generator. For the purpose of support, a smoothing reactor can be short-circuited via a free-wheeling thyristor. Reverse operation is possible by reversing the polarity. Depending on the circuit arrangement, the static power converter control element can exhibit voltage-controlling behavior, or current-controlling behavior, and can be designed as a bridge circuit possessing thyristors in its arms, with facilities for turning these thyristors off. In order, during the process of switching off inductive loads, to avoid impermissible overvoltages at the semiconductor components of the power converter control element, it is necessary to adopt overvoltage protection measures which can be brought into effect quickly. A further problem is the imposition of the current harmonics, which occur during operation of a power converter, onto the supply system.

With regard to the relevant state of the art, attention is drawn, in addition, to the periodical published by the Swiss Brown Boveri Company [Brown Boveri Mitteilungen], 1982, page 157 to 162, and in particular to page 159, which discloses power converter circuits of the twelve-pulse type, each possessing a separate converter for each part-winding of a machine, that is to say of a converter-supplied synchronous motor, as well as a power-converter circuit in association with a single-winding machine and a three-winding transformer, connected on the motor side, for use as a starting converter. In these circuits, two converters are used, in each case, with d.c. intermediate circuits and simple thyristors in the bridge arms. On the line side, they require static converter transformers with two secondary windings, which are electrically shifted through 30°. On the machine side, the stator winding must either be designed to have two separate groups (double-wound machines), or, if the motor is of single-winding design, a three-winding transformer must also be employed on the machine side.

SUMMARY OF THE INVENTION

Accordingly, the objects of this invention are to provide a novel static converter having improved properties, especially guaranteed rapid acting overvoltage protection of the power converter, and of reduced undesirable feedback perturbations, caused by the power converter, on the supply system, and on the load which is to be connected.

The above objects of this invention are achieved by providing a novel static power converter having at least a first bridge circuit including plural thyristor controlled arms, each having at least one thyristor capable of being turned-on and turned-off, wherein the thyristors of each arm have terminals respectively connected to a.c. terminals and d.c. terminals and each a.c. terminal is capacitively coupled to every other a.c. terminal.

One advantage of the invention resides in the fact that these improvements can be obtained by means of only a few additional circuit elements. The capacitors which are used for overvoltage protection can be kept comparatively small if the bridge-circuit thyristors, which can be turned off, are turned on and off at a comparatively high frequency, the capacitors being connected to the a.c. terminals of the bridge circuit. Since, when the switching frequency is high, the current passing through inductive loads which are connected to the power converter is interrupted only briefly, the capacitors need to absorb only a comparatively small amount of energy from these inductive loads, and to store it temporarily. If a bridge circuit, connected on the line side, is operated at a high switching frequency, the harmonics which are produced have correspondingly high order numbers, and the feedback perturbation of the supply system is correspondingly slight, since the amplitudes of the harmonics decrease in proportion to their order numbers.

In accordance with an advantageous embodiment of the invention, undesirable feedback perturbations of the current supply system, and feedback effects on a load which is to be connected, caused by the power converter, can be still further reduced if several bridge circuits, or entire intermediate-circuit converters, are connected in parallel and are operated whereby the pulses are subject to a presettable phase shift.

When synchronous machines are being driven, gentle running-up is rendered possible. The heat losses resulting from the passage of current through the machine are reduced by more effective smoothing of the current, and by avoiding current peaks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
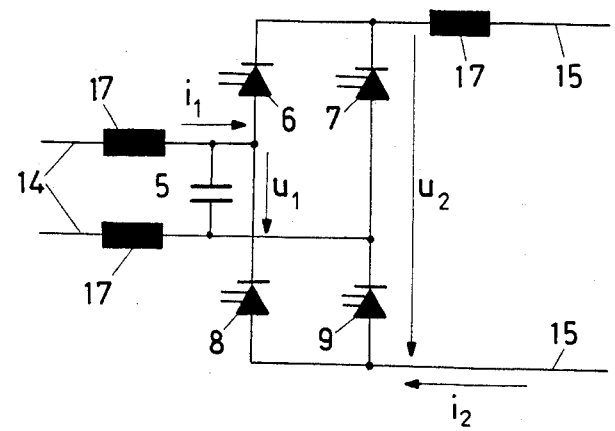
FIG. 1 is a schematic circuit diagram of a static power converter in a two-phase bridge circuit.

Referring now to the drawings, wherein like reference numerals designate identical or corresponding parts throughout the several views, and more particularly to FIG. 1 thereof, a static power converter is shown connected, via an a.c. input terminal 14, to an alternating-voltage supply system, which is not shown, but which supplies an input voltage $u_1$, this input voltage being, in general, sinusoidal, and oscillating at the usual supply-system frequency. The static power converter outputs a rectified current $i_2$ and a pulsating output voltage $u_2$, at a d.c. output terminal 15. The mean value of this output voltage normally is other than zero, while it is adjustable by adjusting the triggering of the power converter. The input and output terminals are connected via a bridge, assembled from controllable valves 6 . . . 9, which are arranged in a manner such that a preferred direction for the output current $i_2$ results. The valves 6 . . . 9 are combined in a known manner, in pairs, and are fired and turned off in alternation, as a result of which an approximately rectangular input current $i_1$, of alternating polarity, is drawn from the a.c. voltage supply system. The output current $i_2$ is kept substantially constant by means of an inductance 17 in the output circuit of the bridge assembly.

Thyristors which can be turned off are used as the controllable valves, and are symbolized by two control input connections.

A capacitor 5 is connected in parallel with the input terminal 14. The valves, or thyristors 6 . . . 9, which can be turned off, the latter being known in power electronics as gate turn-off (GTO) thyristors, can be turned on, or off, at any desired instant. The upper limit to the switching frequency is determined only by the characteristic data of the valve components themselves.

Figure 2:
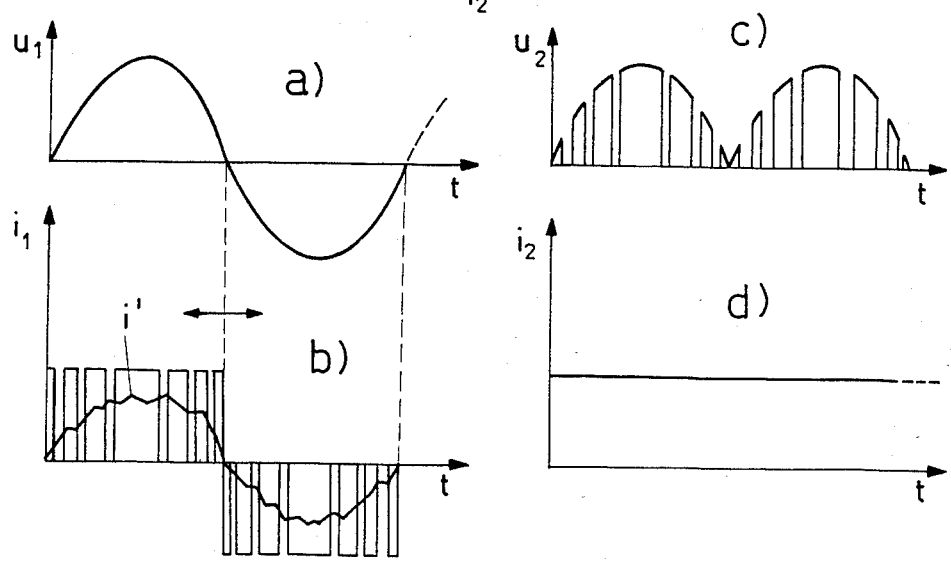
FIGS. 2(a)–(d) are graphs showing the voltages and currents at the input and output terminals of a static power convertor according to FIG. 1.

The advantage which results from the use of the valves 6 . . . 9, which can be turned off, and from the use of the parallel capacitor 5, becomes manifest from the time functions of the currents and voltages, as represented in FIGS. 2(a) to 2(d). While the input voltage $u_1$ varies sinusoidally, FIG. 2(b) shows that the input current $i_1$ is chopped to produce constant-amplitude current pulses, by means of the valves 6 . . . 9 which can be turned off and which are operating in a chopping mode, while the width of these pulses is, on the other hand, modulated in accordance with the variation, as a function of time, of the input voltage $u_1$, that is to say, in a predominantly sinusoidal manner. From these width-modulated current pulses, there results, a time-average value for the current, $i'$, which is virtually sinusoidal, has a comparatively low harmonics content, and, in addition, decreases as the chopping or switching frequency increases.

Since internal inductances 17 are always present on the input side, within the a.c. voltage supply system, voltage peaks are generated during the process of turning off the valves 6 . . . 9 in the course of chopping-mode operation, which can result in damage to the valves themselves, or to other circuit components. The capacitor 5 is provided for this reason and, connected in parallel with the input terminal 14 of the power converter, makes a contribution to supporting the supply system voltage, thus ensuring that dangerous overvoltages are avoided. Here, too, the highest possible chopping frequency entails an advantage, because the cost of providing the capacitor 5 decreases with increasing frequency. For this reason, it is advantageous, in some instances, to select a chopping frequency which exceeds that of the input voltage $u_1$.

As already mentioned, it is usual for inductances 17 to be present on the output side as well, these inductances ensuring that the output current $i_2$ is uniform. In order to maintain the flow of current during the switching pauses which occur in the course of chopping-mode operation between the width-modulated current pulses, it is advantageous if the output current $i_2$ is led, during these periods, via a free-wheeling arm, this being accomplished by appropriate triggering of the valves. If thus, for example, an input current $i_1$, flowing in the positive direction through the pair of valves 6 and 9, is interrupted by a valve 6, which is turning off, a free-wheeling arm can be closed by means of a valve 7 which is firing, running via the valves 9 and 7, which are then conducting, and via which the output current $i_2$, which is maintained by the inductance 17 on the output side, can continue to flow without any hindrance.

Due to the fact that the valves 6 . . . 9 are being operated in a chopping mode, the output voltage $u_2$ is, as shown in FIG. 2(c), composed of width-modulated voltage pulses, the respective amplitudes of which are, however, variable. It is possible, as indicated by the double arrow in FIG. 2(b), to arrange for either positive or negative triggering-delay angles, corresponding, as the case may be, to the input current $i_1$ lagging with respect to the input voltage $u_1$, or leading this voltage, and hence corresponding to an inductive or, as the case may be, to a capacitative component.

Figure 3:
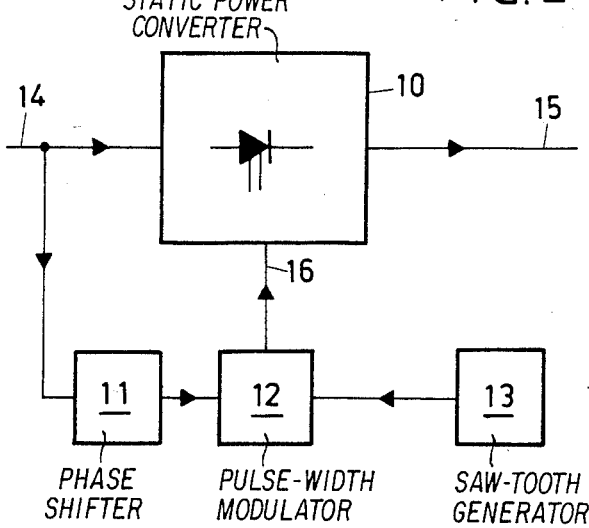
FIG. 3 is a block circuit diagram of a circuit for triggering a static power converter according to FIG. 1.

The control of a static power converter according to FIG. 1 can be implemented, for example, by means of a control circuit of the type represented, in the form of a block diagram, in FIG. 3. A power converter 10 operates between the a.c. voltage input terminal 14 and the d.c. output terminal 15. Power converter 10 is connected, via a control line 16, for transmitting the control pulses, from a pulse-width modulator 12, in which the width-modulated control pulses are generated. The pulse-width modulator contains, in a manner which is known per se, a comparator circuit, in which a delta-shaped voltage, from a saw-tooth generator 13, is compared with a sinusoidal voltage which is derived from the input voltage $u_1$, via a phase shifter 11. The frequency of the saw-tooth generator 13 determines the chopper frequency, or switching frequency, at which the valves 6 . . . 9, which can be turned off, are operated. The triggering-delay angle, which determines whether inductive or capacitative components are to be present in the current, is fixed with the aid of the phase shifter 11, which shifts the frequencies of width-modulated pulses, and hence brings about a shift in the mean value of the current i' with respect to the input voltage $u_1$. Finally, the pulse-width modulator 12 further contains a control-logic device (not shown) which switches, during the switching pauses of the chopping operation, that free-wheeling arm which is appropriate at the time in question.

The circuit arrangement according to the invention, as has been explained, by reference to FIG. 1, on the basis of an illustrative embodiment including a two-phase bridge circuit, can be transferred, in an analogous manner, to a large number of other applications. It is thus possible, in a simple manner, to expand the two-phase bridge circuit, as given in the example, to produce a three-phase bridge circuit, which is operated, on the input side, on a three-phase supply system. Although, in these cases, a constant-frequency supply voltage is available, the concept of the invention can, however, also be applied when, for example, a three-phase motor takes the place of the supply system, that is to say when the power converter is employed as an inverter, producing an a.c. voltage across its input terminals, from a d.c. voltage across its output terminals.

From an application-related point of view, it is particularly interesting to connect a three-phase asynchronous squirrel-cage motor, in order to drive it at different frequencies. When the motor is running, the power then flows from the d.c. side and, via the power converter, to the a.c. side, and thence into the motor. In such a case, the circuit is generally supplemented on the d.c. side, that is to say at the d.c. output terminal, by means of a controlled rectifier, in a known manner, which enables a controllable direct voltage, for the power converter, to be obtained from a three-phase supply system to which connection is made. It is, of course, possible for this controlled rectifier to be, once again, a power converter in accordance with FIG. 1, expanded to incorporate a three-phase bridge circuit.

It is possible, furthermore, to connect a power-converter circuit arrangement in accordance with the invention, in a three-phase bridge circuit, to the rotor side of an asynchronous slipring-motor, connection being made to the alternating-voltage side of the power-converter circuit. Here, too, the circuit is then supplemented, on the d.c. side, by means of a controlled rectifier, in the above-mentioned manner. The entire arrangement then forms a sub/super-synchronous cascade, which permits the speed of the asynchronous slipring-rotor machine to be regulated, and the setting, on the stator side, of any phase angle (or cos $\phi$) which may be desired.

Overall, the invention results in a flexible power-converter circuit arrangement, which can be varied, is of simple construction, and possesses the special advantage that the feedback-perturbation of the supply system, in the form of harmonics, is considerably reduced, and that its input current can contain an inductive component, or a capacitative component, according to choice.

Figure 4:
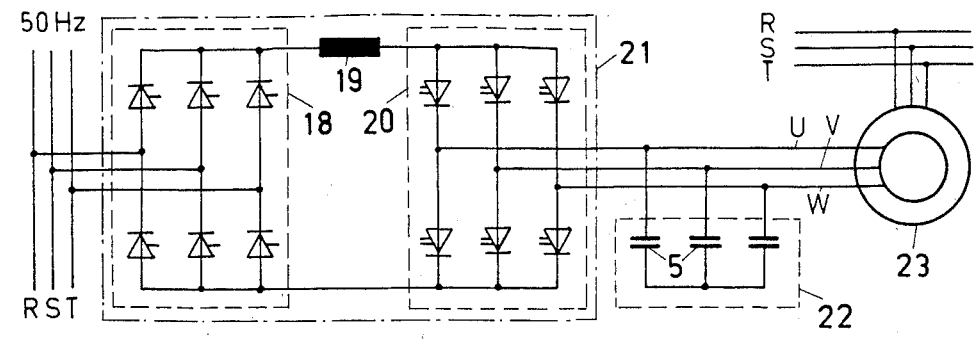
FIG. 4 is a schematic circuit diagram of an intermediate-circuit converter, which is connected, on the one hand, to an a.c. supply system and, on the other hand, to the rotor windings of an asynchronous machine possessing a slipring-rotor, the intermediate-circuit converter including an overvoltage protection unit, and thyristors, which can be turned off, in the power-converter bridge which is connected on the machine side.

In the case of the design shown in FIG. 4, a three-phase intermediate-circuit converter 21 includes a power-converter bridge 18, on the line side, the a.c. terminals of this bridge being connected to supply-system phase conductors, R,S,T, of a 50-Hz three-phase supply system. The d.c. terminals of the power-converter bridge 18 are connected to those of a power-converter bridge 20 which is itself connected on the machine side. One of the terminals of the bridge 18 (positive-voltage output) is connected to the bridge 20 via an intermediate-circuit reactor 19, and the other (negative-voltage output) terminal of bridge 18 is connected directly to bridge 20. The line side power-converter bridge 18 includes simple thyristors in the bridge arms, while thyristors which can be turned off are employed in the power-converter bridge 20 which is connected on the machine side. The a.c. terminals of the power-converter bridge 20 which is connected on the machine side are themselves connected, via machine phase-conductors, U,V,W, to the sliprings of an asynchronous machine 23 and to three capacitors 5 of an overvoltage protection unit 22. One side of each of the capacitors 5 is connected to a phase conductor, U, or V, or W, while the other sides are interconnected. The field windings of the asynchronous machine 23 are connected to the supply-system phase conductors R, S, and T.

Figure 5:
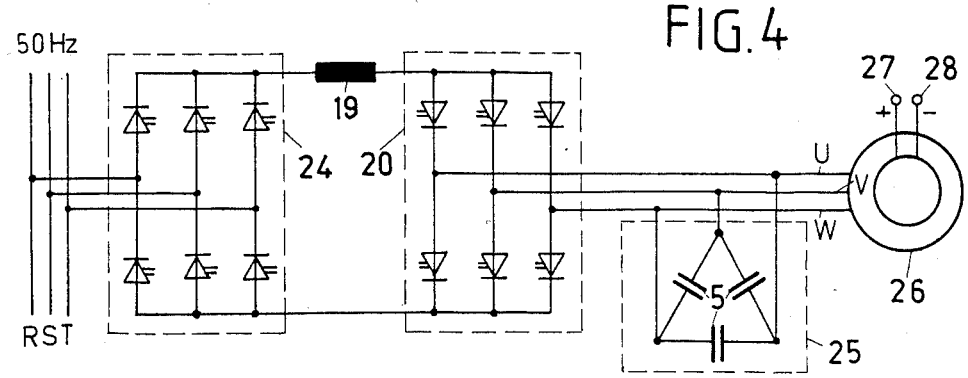
FIG. 5 is a schematic circuit diagram of an intermediate-circuit converter which is connected to the field windings of a synchronous machine, this converter possessing thyristors, which can be turned off, in both the line-side and machine-side power-converter bridges, and an overvoltage protection unit in which the capacitors are connected in a manner differing from that shown in FIG. 4.

In the case of the design shown in FIG. 5 the a.c. terminals of the power-converter bridge 20 of a three-phase intermediate-circuit converter 21, this bridge 20 being on the machine side, are connected, via phase-conductors U, V, and W, to the field windings of a synchronous machine 26, on the one side, and to three capacitors 5 of an overvoltage protection unit 25, on the other. Each capacitor 5 is connected directly to two machine phase-conductors, namely to U and V, V and W, and W and U respectively. The rotor-winding terminals of the synchronous machine 26 are marked 27 and 28. In contrast to the intermediate-circuit converter shown in FIG. 4, the intermediate-circuit converter 21 possesses a power-converter bridge 24 on the line side, with thyristors which can be turned off.

During the process of turning off the thyristors of the power-converter bridge 20, on the machine side, the capacitors of the overvoltage protection units, 22 and 25, absorb electrical energy which has been stored in the rotor and/or field windings of the a.c. machines. By doing so, they prevent overvoltages from occurring, which would be harmful, especially to the thyristors.

The use of the power-converter bridge 24, on the line side, possessing thyristors which can be turned off, enables the switching frequency to be higher than that in the case of the power-converter bridge 18, thus enabling undesired current harmonics with low order-numbers to be avoided, and thus reducing the interfering feedback perturbations affecting the supply system. In addition, the phase angle can, to a substantial extent, be freely adjusted, in the four quadrants, so that reactive power, of an inductive or capacitative nature, as well as active power, can additionally be drawn from the three-phase supply system, according to choice.

Figure 6:
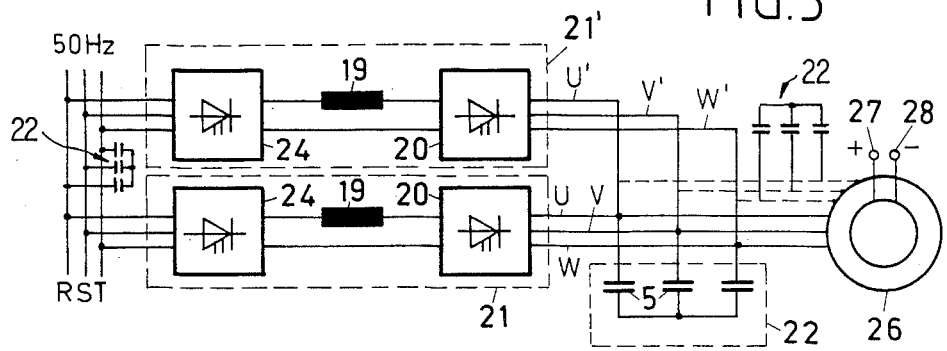
FIG. 6 is a schematic circuit diagram showing two intermediate-circuit converters in accordance with FIG. 5, which are connected in parallel and which are operated with a phase difference, these converters possessing only one overvoltage protection unit in accordance with FIG. 4.

In the case of the design shown in FIG. 6, two intermediate-circuit converters, 21 and 21', as shown in FIG. 5, are connected in parallel, and are operated with a phase-difference in respect of the pulses which are generated, this phase-difference being presettable. The a.c. output terminals of the power-converter bridges 20 of these intermediate-circuit converters 21 and 21', these bridges 20 being on the machine side, are connected, via machine phase-conductors, U, V, and W, and U', V', W' respectively to the field windings of a synchronous machine 26, on the one side, and to an overvoltage protection unit 22, as shown in FIG. 4, on the other side.

The connections for a double-wound machine, incorporating two secondary windings, are indicated by broken lines. In this case, the machine phase-conductors, U, V, and W, and U', V', and W' are not interconnected, but are individually connected to an overvoltage protection unit, 22 or 25, of the type shown in FIG. 4 or FIG. 5.

This design permits the order-number of undesired harmonics to be increased, and consequently enables the interfering feedback-perturbations, affecting the supply system and the load, to be further reduced.

Figure 7:
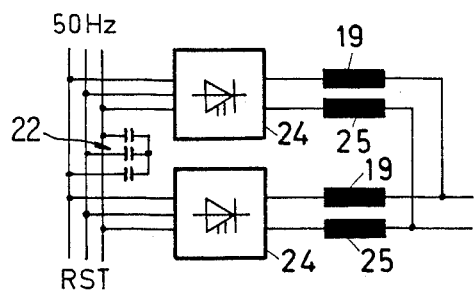
FIG. 7 is a schematic circuit diagram showing two parallel-connected power-converter bridges, with reactors in the circuits leading to each of the direct-voltage terminals.

In the case of the design shown in FIG. 7, two power-converter bridges 24, which are connected on the line side, are connected in parallel, via intermediate-circuit reactors 19 and 25, which are connected, in each case, to their positive and negative direct-voltage output terminals. At the same time, the pulses of the two power-converter bridges 24 are timed so as to be non-simultaneous.

The above arrangement enables feedback-perturbations, affecting the supply system, and originating from the power converter, to be reduced. As a rule, this arrangement requires no additional expenditure of thyristors, for several thyristors are, in any case, required for each bridge arm, these thyristors being connected in series, or in parallel.

In the embodiments of the invention according to FIGS. 5 to 7, the a.c. terminals of the power-converter bridges, on the line side, are preferably connected to the capacitors of overvoltage protection units, 22 or 25, according to FIG. 4 or, as the case may be, to FIG. 5, these capacitors being shown as "star" connected protection units 22 in FIGS. 6 and 7.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A converter having fast-acting overvoltage protection, comprising:
    plural bridge circuits each having a.c. voltage terminals and d.c. voltage terminals, wherein each a.c. voltage terminal of each bridge circuit is coupled with every other a.c. voltage terminal of the plural bridge circuits by means at least one capacitor;
    said plural bridge circuits each having an a.c. side and a d.c. side and said plural bridge circuits being phasewise parallel-connected on the a.c. side thereof;
    said plural bridge circuits connected in pairs in which the d.c. sides of each pair are parallel-connected to each other by means of at least one intermediate circuit reactor; and
    said plural bridge circuits, comprising bridge arms having GTO thyristors that can be switched off, being driven out of phase with respect to one another.

2. A converter according to claim 1, comprising:
    pulse-width modulator means for pulse-triggering the GTO thyristors of each bridge arm in a chopper mode by means of pulses which are width-modulated in accordance with a predetermined variation as a function of time of an input voltage, comprising,
    a saw-tooth generator originating a delta function,
    a phase shifter having an input connected to an a.c. input terminal of said bridge circuits and an output, and
    a pulse-width modulator for triggering the GTO thyristors, said pulse-width modulator connected to the output of said phase shifter and connected to said saw-tooth generator to receive a delta-shaped voltage therefrom, said pulse-width modulator including means for generating width-modulated pulses based on the delta function from the saw-tooth generator and the phase-shifted a.c. voltage from said phase shifter, said saw-tooth generator generating a signal defining a chopping frequency which is considerably higher than that of the a.c. voltage applied to said pulse width modulator from said phase shifter.

3. A converter having fast-acting overvoltage protection, comprising:
    plural intermediate circuit converters each including a first bridge circuit connected to a second bridge circuit by means of at least one intermediate circuit reactor, said first bridge circuit of each intermediate circuit converter having a.c. voltage terminals which are connected to the a.c. voltage terminals of every other first bridge circuit by at least one capacitor;
    at least the second bridge circuits of the intermediate-circuit converters having a.c. voltage terminals which are phasewise parallel-connected on an a.c. side of the said second bridge circuits; and
    said first and second bridge circuits of said intermediate circuit converters having bridge arms including GTO thyristors that can be switched off, said intermediate circuit converters being driven out of phase with respect to one another.

4. A converter according to claim 3, comprising:
    pulse-width modulator means for pulse-triggering the GTO thyristors of each bridge arm in a chopper mode by means of pulses which are width-modulated in accordance with a predetermined variation as a function of time of an input voltage, comprising,
    a saw-tooth generator originating a delta function,
    a phase shifter having an input connected to an a.c. input terminal of said bridge circuits and an output, and
    a pulse-width modulator for triggering the GTO thyristors, said pulse-width modulator connected to the output of said phase shifter and connected to said saw-tooth generator to receive a delta-shaped voltage therefrom, said pulse-width modulator including means for generating width-modulated pulses based on the delta function from the saw-tooth generator and the phase-shifted a.c. voltage from said phase shifter, said saw-tooth generator generating a signal defining a chopping frequency which is considerably higher than that of the a.c.

voltage applied to said pulse width modulator from said phase shifter.

5. A converter according to claim 3, further comprising:
said first bridge circuits of the intermediate circuit converters being phasewise parallel-connected to each other on an a.c. side of said first bridge circuits.

6. A converter according to claim 5, comprising:
pulse-width modulator means for pulse-triggering the GTO thyristors of each bridge arm in a chopper mode by means of pulses which are width-modulated in accordance with a predetermined variation as a function of time of an output voltage, comprising,
a saw-tooth generator originating a delta function,
a phase shifter having an input connected to an a.c. input terminal of said bridge circuits and an output, and
a pulse-width modulator for triggering the GTO thyristors, said pulse-width modulator connected to the output of said phase shifter and connected to said saw-tooth generator to receive a delta-shaped voltage therefrom, said pulse-width modulator including means for generating width-modulated pulses based on the delta function from the saw-tooth generator and the phase-shifted a.c. voltage from said phase shifter, said saw-tooth generator generating a signal defining a chopping frequency which is considerably higher than that of the a.c. voltage applied to said pulse width modulator from said phase shifter.

* * * * *